United States Patent [19]

Collins

[11] Patent Number: 4,547,937
[45] Date of Patent: Oct. 22, 1985

[54] SNAP LOCK CONNECTOR WITH PUSH-BUTTON RELEASE

[75] Inventor: Walter W. Collins, North, S.C.

[73] Assignee: Gerber Legendary Blades, Portland, Oreg.

[21] Appl. No.: 529,501

[22] Filed: Sep. 6, 1983

[51] Int. Cl.⁴ ............................................. A44B 17/00
[52] U.S. Cl. ........................................ 24/607; 29/606
[58] Field of Search ................ 24/625, 615, 606, 607, 24/608, 627, 2; 224/242, 245, 232; 30/151, 143

[56] References Cited

U.S. PATENT DOCUMENTS

| | | | |
|---|---|---|---|
| 619,809 | 2/1899 | Unser | 24/607 X |
| 1,012,222 | 12/1911 | Phinney | 24/606 X |
| 1,425,618 | 8/1922 | Vodicka | 24/607 |
| 1,798,796 | 3/1931 | Johnson | 24/607 |
| 2,391,574 | 12/1945 | Housinger | 30/151 |
| 2,494,159 | 1/1950 | Bernstein | 24/606 X |
| 2,901,823 | 9/1959 | Widen | 224/232 X |
| 3,479,075 | 11/1969 | Swanno | 24/607 X |

FOREIGN PATENT DOCUMENTS

| | | | |
|---|---|---|---|
| 123370 | 11/1927 | Switzerland | 24/606 |
| 22407 | 3/1914 | United Kingdom | 24/627 |

Primary Examiner—William E. Lyddane
Assistant Examiner—Peter A. Aschenbrenner
Attorney, Agent, or Firm—Clifton T. Hunt

[57] ABSTRACT

A snap lock connector is provided for positively mechanically locking two articles together while enabling their immediate separation responsive to the push of a button. The device comprises a bifurcated locking member extending from a first article and normally urged outwardly into locking position within a chamber in a second article. A push-button surmounts the locking member and projects outwardly from the second article. When the push-button is depressed, it overcomes the spring tendency of the locking member and moves the bifurcated locking portion together enabling to be withdrawn from the second article, whereupon the second article may be separated from the first article. The invention is capable of many uses, including the locking of a knife in its sheath.

5 Claims, 10 Drawing Figures

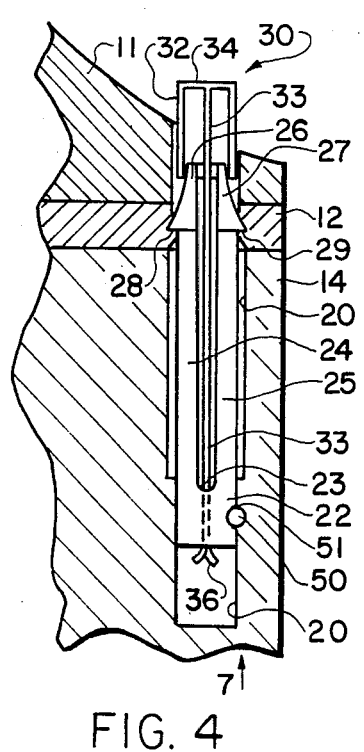
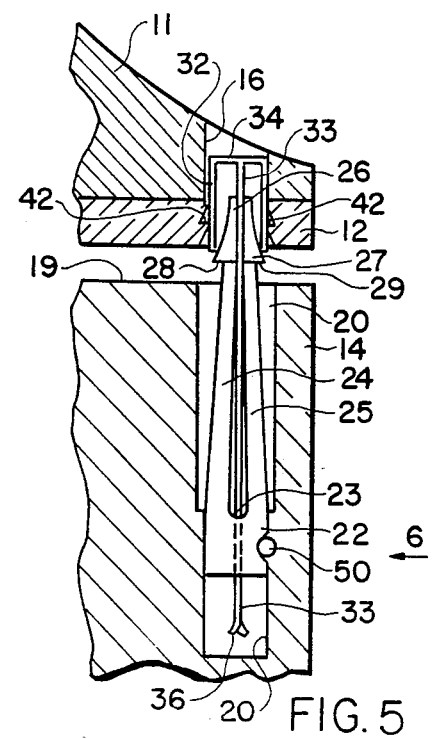
FIG. 4  FIG. 5
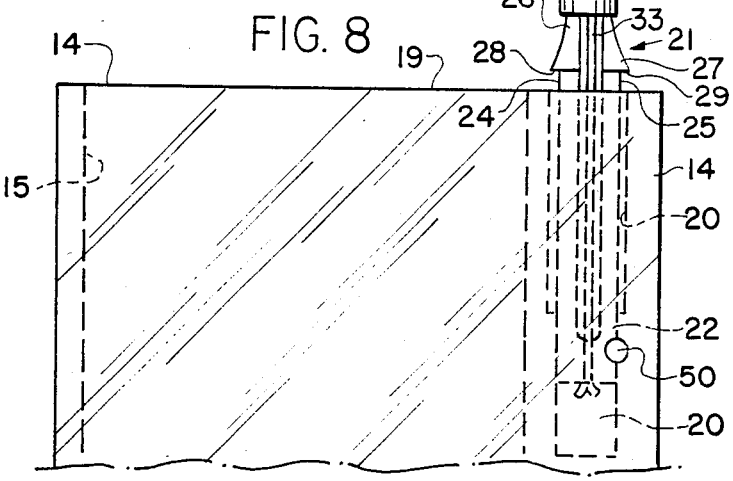
FIG. 8
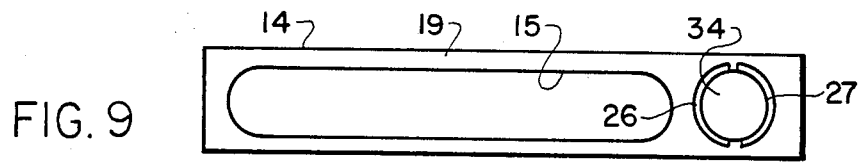
FIG. 9

நாலு்4,547,937

SNAP LOCK CONNECTOR WITH PUSH-BUTTON RELEASE

BACKGROUND OF THE INVENTION

Snap lock fasteners utilizing a bifurcated locking member have long been known. See, for example, U.S. Pat. Nos. 1,370,995; 2,391,574; 2,527,710; and 2,527,711. In each instance the mechanism enables two articles to be fastened together. Some such prior art devices do not enable a positive locking but only frictional locking so that the locking is overcome to release the two articles by the application of sufficient force. In other instances, the release mechanism is susceptible of being accidentally activated to undesirably release the two articles, as a knife from its sheath.

SUMMARY OF THE INVENTION

The deficiencies of the prior art are overcome by the present invention which combines a positive mechanical lock with an easily operable push-bottom release that quickly and cleanly deactivates the locking mechanism to permit instant separation of two articles, such as a knife from its sheath.

According to the invention, a locking member projects beyond one surface of a first article such as a sheath or scabbard, and a second article such as the hilt of a knife has a shaped opening extending therethrough for reception of the locking member. The locking member includes a push-button release which extends completely through the opening in the second article when the two articles are put together in fastening relation, as when a knife is inserted in a sheath. As the push-button extends through the opening in the second article, the locking member engages an abutment within the hole in the second article to hold the two articles together. The locking member extending from the first article is disengaged from the abutment in the second article by depressing the push-button to separate the articles.

BRIEF DESCRIPTION OF THE DRAWINGS

FIG. 4 is a sectional view taken substantially along the Line 4—4 in FIG. 1 and illustrating the locking mechanism in the active or locked position;

FIG. 5 is a view similar to FIG. 4 but showing the locking mechanism in the inactive or release position;

FIG. 8 is a front view of the top portion of the sheath with the locking mechanism and push-button release extending therefrom in position to receive and lock a knife;

FIG. 9 is a top plan view of the sheath and the push-button release and locking member.

DETAILED DESCRIPTION OF THE INVENTION

The utility of the invention is illustrated and described in association with a knife and a sheath, although the invention is useful for other applications.

Figure 1:
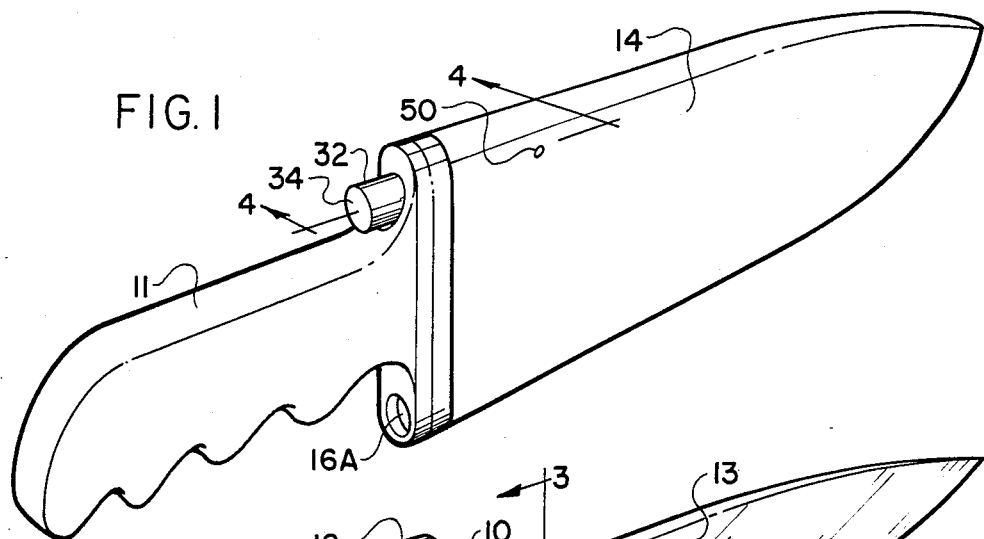
FIG. 1 is a perspective view of a knife locked within its sheath according to the present invention.
Figure 2:
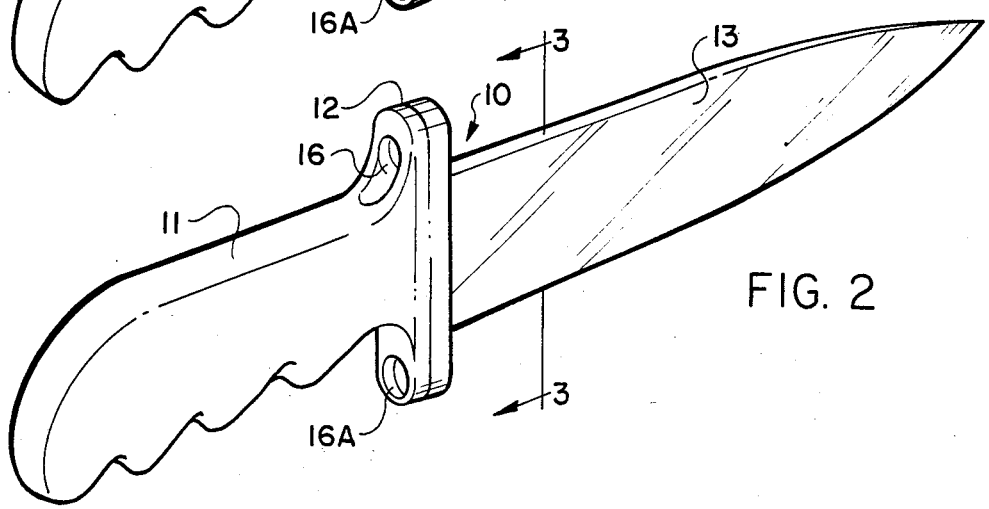
FIG. 2 is a perspective view of the knife removed from the sheath.
Figure 3:
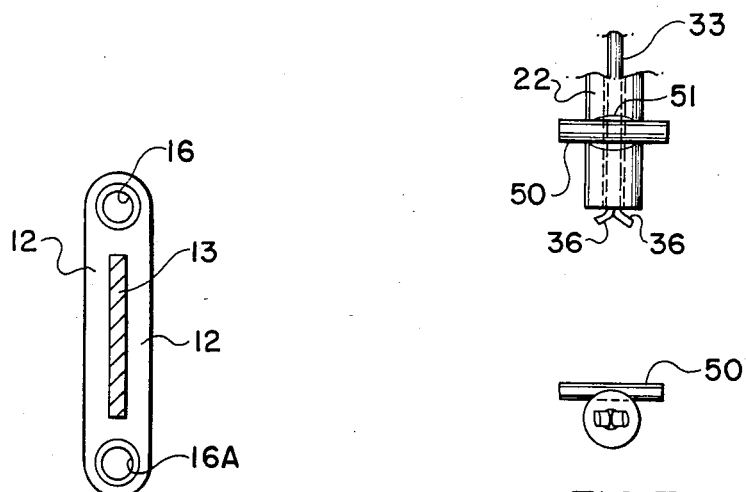
FIG. 3 is a sectional view taken substantially along the Line 3—3 in FIG. 2.

Referring more specifically to the drawings, the knife, broadly indicated at 10, is a sheath knife including a handle 11, a hilt 12 and a fixed blade 13. A sheath 14 is preferably made from rigid plastic and includes the usual slot or opening 15 to receive the knife blade 13. The handle 11 may be conventionally formed from any desired substance such as rigid plastic but the hilt 12 is preferably formed from steel or other rigid metal. As most clearly seen in FIG. 3, the handle 11 and hilt 12 have two round holes or openings 16 and 16A extending therethrough in parallel relation to the blade 13 and spaced outwardly from opposed edges of the blade. The sheath 14 has a circular cavity 20 communicating with the top surface 19 of the sheath 14 and extending inwardly in parallel relation to the slot or opening 15 for the knife blade 13. The openings 16 and 16A are selectively registrable with the cavity 20 in sheath 14, depending on how the knife is placed in the sheath.

A lock mechanism broadly indicated at 21 (FIG. 8) is housed within the opening 20 and includes a tubular sleeve 22 bifurcated as at 23 (FIGS. 4 and 5) to define legs 24 and 25 projecting beyond the upper end 19 of sheath 14. The outer end of each leg 24 and 25 terminates in a semifrusto-conical portion 26 and 27, respectively, to define respective shoulders 28 and 29 at the junctures of legs 24 and 25 with respective semifrusto-conical portions 26, 27.

A push-button release mechanism 30 includes an inverted cup-shaped push-button or cap 32 surrounding the free ends of the semifrusto-conical portions 26, 27. The release mechanism 30 includes an elongated pin 33 fixed to the inner surface of the top wall 34 of the push-button 32 and extending therefrom axially of the opening 20 through and beyond the inner end of the tubular sleeve 22. The inner end of the pin 33 remote from the push-button 32 is upset as at 36 to limit outward movement of the push-button 32 relative to the tubular sleeve 22 and maintain the push-button 32 in surrounding relation to the semifrusto-conical portions 26 and 27 of sleeve 22 at all times.

Each opening 16 and 16A through handle 11 and hilt 12 includes a straight wall through the handle and hilt and an inwardly diverging wall 40 extending from the straight wall within the hilt to a plane 41 within the hilt 12, where the inwardly diverging wall 40 terminates and defines an abutment 42 dimensioned to accommodate the shoulders 28 and 29 on the tubular sleeve 22. Diverging wall 43 communicates with the free edge 44 of hilt 12 to facilitate entry of the push-button 32 in opening 16 or 16A when the knife is placed in the sheath.

Figure 6:
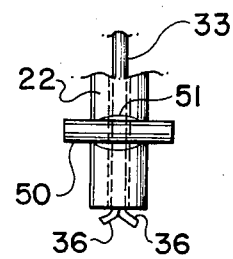
FIG. 6 is an enlarged fragmentary view, with parts broken away, locking in the direction of the arrow 6 in FIG. 5 and illustrating the assembly of the locking member and the push-button release within the sheath.
Figure 7:
FIG. 7 is a fragmentary view looking in the direction of the arrow 7 in FIG. 4 and further illustrating the assembly of the locking mechanism and push-button release within the sheath.
Figure 10:
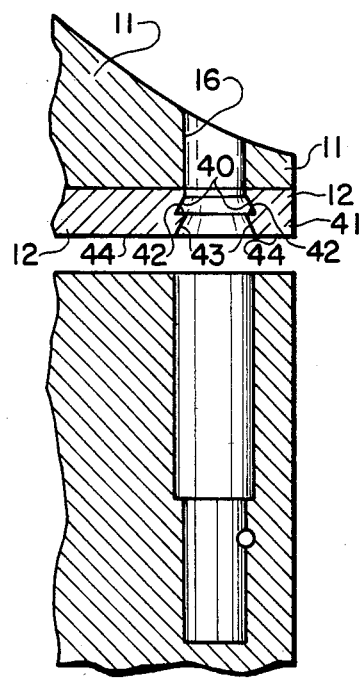
FIG. 10 is an enlarged fragmentary sectional view similar to FIG. 5 but omitting the locking mechanism and its push-button release.

The sleeve 22 is held within the opening 20 in sheath 14 by a pin 50 frictionally retained within an opening in the wall of the sheath 14. The tubular sleeve 22 has a transverse groove 51 (FIG. 6) adjacent its inner end remote from the semifrusto-conical portions 26, 27 and the pin 50 registers with the groove 51 when the locking mechanism 21 is mounted in the opening 20 in sheath 14. Thus, the entire locking mechanism 21 and release mechanism 30 is attached to the rigid sheath 14 with the shoulders 28 and 29 of the locking mechanism 21 permanently spaced above the top wall 29 of the sheath a distance at least as great as the distance of the abutment 42 from the free edge 44 of hilt 12 (FIG. 8).

In use, the blade 13 of the knife 10 is positioned within the opening 15 in sheath 14 in the usual manner. As the knife is pushed fully into the sheath, the push-button 32 registers with a selected opening 16 or 16A. Continued inward movement of the knife 10 relative to the sheath 14 moves the push-button 32 of the release mechanism 30 past the diverging wall 43, and as the frusto-conical portions 26 and 27 engage the straight wall of the opening 16 or 16A they are biased inwardly toward each other until they spring apart to the position of FIG. 4 after further inward movement of the knife brings the frusto-conical portions 26, 27 and their shoulders 28, 29 into registry with the diverging wall 40 and abutment 42 to positively lock the knife in the sheath. The knife is thus firmly locked within the sheath and cannot be physically removed as long as the shoulders 28 and 29 on the locking mechanism 21 on the sheath 14 overlie the abutment 42 in the hilt of the knife.

The knife 10 may be moved from the sheath 14 by applying downward pressure on the top wall of push-button 32 as it extends above the handle 11 in the locked position of FIG. 4. Downward movement of the push-button release mechanism 30 moves the push-button 32 from its extended position above the handle as shown in FIG. 4 to its depressed position within the handle and hilt as shown in FIG. 5. There is no corresponding movement of the locking mechanism 21 and as the inverted cup-shaped push-button 32 moves inwardly from the position of FIG. 4 to the position of FIG. 5 it traverses the semifrusto-conical portions 26 and 27 moving them inwardly toward each other and away from the abutment 42, permitting the knife to be removed from the sheath as illustrated in FIG. 5.

There is thus provided an improved snap lock fastener with a positive mechanical lock for connecting two articles and requiring a positive mechanical force to separate the articles when desired. Although specific terms have been used in describing the invention, they are used in a descriptive sense only and not for purposes of limitation.

I claim:

1. A snap-lock fastener for releasably joining together first and second articles, said snap-lock fastener comprising a locking mechanism and a push-button release mechanism, means connecting the locking mechanism and the push-button release mechanism together, means supporting the locking mechanism and push-button release mechanism in extended relation to said first article, the second article having an opening registrable with the locking mechanism and push-button release mechanism, interengaging means within said opening and on said locking mechanism normally connecting the two articles, said interengaging means being responsive to relative movement of the push-button release mechanism and the locking mechanism to disengage the interengaging means and separate the two articles, and said locking mechanism comprising a tubular sleeve, a split frusto-conical end portion at one end of the sleeve, means connecting the other end of the sleeve to said first article with the frusto-conical end of the sleeve projecting beyond said first article and a shoulder projecting in right angular relation to the opening in said second article at its juncture with the frusto-conical end portion comprising the interengaging means with the second article, said push button release mechanism engaging the frusto-conical end portion to substantially close the said split end portion whereby the shoulder disengages the second article.

2. An article according to claim 1 including means normally biasing the shoulder radially outwardly from the axis of the sleeve.

3. A snap lock fastener according to claim 2 wherein the tubular sleeve is bifurcated and said split frustro-conical end portion comprises a frusto-conical portion and shoulder on one leg of the bifurcated sleeve, and a second frusto-conical portion and shoulder on the other leg of the bifurcated sleeve.

4. A snap fastener assembly according to claim 3 wherein the push-button release mechanism includes a push-button having an inverted cup-like configuration and arranged in surrounding relation to the frusto-conical portions of the locking mechanism, and means connecting the push-button to the locking mechanism for limited relative axial movement.

5. A structure according to claim 4 wherein said means for connecting the push-button to the locking mechanism for relative limited axial movement comprises a pin extending from the push-button through and beyond the tubular sleeve, and means permitting inward movement of the push-button and pin relative to the locking mechanism but limiting outward axial movement of the push-button and pin relative to the locking mechanism.

* * * * *